(12) United States Patent
Simendinger, III et al.

(10) Patent No.: US 7,687,150 B2
(45) Date of Patent: Mar. 30, 2010

(54) THERMAL BARRIER COMPOSITION

(75) Inventors: William H. Simendinger, III, Raleigh, NC (US); David William Garrett, Raleigh, NC (US)

(73) Assignee: Microphase Coatings, Inc., Garner, NC (US)

( * ) Notice: Subject to any disclaimer, the term of this patent is extended or adjusted under 35 U.S.C. 154(b) by 1113 days.

(21) Appl. No.: 11/324,687

(22) Filed: Jan. 3, 2006

(65) Prior Publication Data

US 2006/0110612 A1    May 25, 2006

Related U.S. Application Data

(63) Continuation of application No. 10/814,213, filed on Mar. 31, 2004, now abandoned.

(60) Provisional application No. 60/461,800, filed on Apr. 10, 2003.

(51) Int. Cl.
*B32B 9/04* (2006.01)

(52) U.S. Cl. ............. 428/447; 106/287.16; 106/287.19; 524/430; 524/431; 524/432; 524/447; 525/477; 528/34

(58) Field of Classification Search ................ None
See application file for complete search history.

(56) References Cited

U.S. PATENT DOCUMENTS

| | | | |
|---|---|---|---|
| 4,405,679 A | 9/1983 | Fujioka et al. | |
| 4,510,283 A | 4/1985 | Takeda et al. | |
| 4,602,959 A | 7/1986 | Kurita et al. | |
| 4,725,501 A | 2/1988 | Rukavina et al. | |
| 4,753,827 A | 6/1988 | Yoldas et al. | |
| 4,814,017 A | 3/1989 | Yoldas et al. | |
| 4,816,288 A | 3/1989 | Rukavina et al. | |
| 4,990,547 A | 2/1991 | Stovicek | |
| 5,068,277 A | 11/1991 | Vukov et al. | |
| 5,096,488 A | 3/1992 | Stovicek | |
| 5,173,110 A | 12/1992 | Stovicek | |
| 5,218,059 A | 6/1993 | Kishihara et al. | |
| 5,232,996 A | 8/1993 | Shah et al. | |
| 5,298,060 A | 3/1994 | Harakal et al. | |
| 5,331,074 A | 7/1994 | Slater et al. | |
| 5,433,941 A | 7/1995 | Patel | |
| 5,492,730 A | 2/1996 | Balaba et al. | |
| 5,593,732 A | 1/1997 | Griffith | |
| 5,663,215 A | 9/1997 | Milligan | |
| 5,688,851 A | 11/1997 | Kress | |
| 5,939,478 A | 8/1999 | Beck et al. | |
| 5,942,583 A | 8/1999 | Azechi | |
| 5,958,116 A | 9/1999 | Kishihara et al. | |
| 6,013,724 A | 1/2000 | Mizutani et al. | |
| 6,045,869 A | 4/2000 | Gesser et al. | |
| 6,313,193 B1 | 11/2001 | Simendinger, III | |
| 6,476,095 B2 | 11/2002 | Simendinger, III | |
| 6,559,201 B2 | 5/2003 | Simendinger, III | |
| 2003/0152785 A1* | 8/2003 | Sanders et al. | 428/447 |

FOREIGN PATENT DOCUMENTS

| | | |
|---|---|---|
| EP | 0563939 A1 | 10/1993 |
| EP | 0664322 A1 | 7/1995 |
| EP | 0851009 A2 | 7/1998 |
| JP | 60-254034 A * | 12/1985 |
| JP | 62-277475 | 12/1987 |
| JP | 2000319582 | 11/2000 |
| WO | WO 95/16751 A1 | 6/1995 |
| WO | WO 01/02506 A1 | 1/2001 |
| WO | WO 02/059210 A2 | 8/2002 |

OTHER PUBLICATIONS

Notification of Transmittal of the International Search Report and the Written Opinion of the International Searching Authority, or the Declaration, PCT/US2004/10539, Apr. 5, 2005.
Supplementary European Search Reporting corresponding to European Application No. EP04749782 dated Jan. 14, 2008.
U.S. Appl. No. 10/960,666, filed Oct. 7, 2004, Simendinger.
U.S. Appl. No. 11/149,886, filed Jun. 10, 2005, Simendinger et al.
U.S. Appl. No. 11/370,683, filed Mar. 8, 2006, Miller.
Naval Research Reviews, *Biofouling*, Office of Naval Research, Four/1997 vol. XLIX.

* cited by examiner

*Primary Examiner*—Marc S Zimmer
(74) *Attorney, Agent, or Firm*—Myers Bigel Sibley & Sajovec, PA

(57) ABSTRACT

The thermal barrier composition of the present invention provides a glassy matrix comprising an alkoxy-functionalized siloxane and a functionally-terminated silane or siloxane, polymethylsilsesquioxane dissolved in a crosslinking agent, and optionally a filler and/or hollow glass microspheres.

22 Claims, No Drawings

THERMAL BARRIER COMPOSITION

RELATED APPLICATION

The instant application is a continuation application of U.S. patent application Ser. No. 10/814,213 filed Mar. 31, 2004 and claims priority to U.S. Provisional Application Ser. No. 60/461,800 filed Apr. 10, 2003 the disclosures of which are incorporated herein by reference in their entireties.

FIELD AND BACKGROUND OF THE INVENTION

The present invention relates to a thermal barrier composition for use on a variety of substrates that are exposed to high temperatures. Exemplary substrates include pipelines, engine parts including jet engine components, water conduits including tubes in power plants, reactor vessels and exhaust manifolds.

Substrates, particularly metal substrates, can be subjected to high temperatures causing fatigue, cracking, distortion and the like of the substrate. For example, components of a jet engine or the surrounding parts of the jet can be exposed to temperatures in excess of 1800° F. In such a situation, it is readily apparent that fatiguing or cracking can lead to catastrophic failure. Similarly, piping used in various manufacturing facilities can be subjected to temperatures in excess of 400° F. caused by the liquid or gas passing through the pipe. In such an application, it is preferred that the coating not only provide a thermal barrier but also provide anti-corrosion properties.

SUMMARY OF THE INVENTION

The thermal barrier composition of the present invention comprises a glassy matrix comprising an alkoxy-functionalized siloxane and a functionally-terminated silane or siloxane, polymethylsilsesquioxane dissolved in a crosslinking agent, and optionally a filler and/or hollow glass microspheres. The glass matrix provides good adhesion to the surface being coated, as well as, toughness, crack resistance, durability, abrasion resistance, heat resistance and stability in the particular environment.

DETAILED DESCRIPTION OF THE INVENTION

As briefly discussed above, the present invention relates to a thermal barrier composition. The thermal barrier compositions of the present invention comprise a glassy matrix comprising: an alkoxy-functionalized siloxane and a functionally-terminated silane or siloxane; (b) polymethylsilsesquioxane dissolved in a crosslinking agent; and optionally (c) and (d) a filler and/or hollow glass microspheres. The thermal barrier composition of the present invention can be coated onto a wide variety of substrates including steel, stainless steel, titanium, aluminum, magnesium and zinc. The coating can withstand continuous use temperatures of 1800° F. or higher. Moreover, the composition is resistant to corrosive agents such as nitrogen and sulfur compounds.

Suitable alkoxy-functionalized siloxanes include polydiethoxysiloxane, tetraethoxysilane, tetramethoxysilane, and polydimethoxysiloxane. A preferred alkoxy-functionalized siloxane is polydiethoxysilane. Suitable functionally-terminated silanes or siloxanes include silanol-terminated, vinyl-terminated and amino-terminated silanes or siloxanes such as epoxy-functionalized polydimethylsiloxane, aminopropyltriethoxy silane and silanol-terminated siloxane.

The glassy matrix is crosslinked using a titanium or tin catalyst. Suitable catalysts include titanium alkoxides such as titanium methoxide, titanium ethoxide, titanium isopropoxide, titanium propoxide, titanium butoxide, titanium diisopropoxide (bis 2,4-pentanedionate), titanium diisopropoxide bis(ethylacetoacetao) titanium ethylhexoxide, and organic tin compounds such as dibutyl tin diacetate, dibutyltin laurate, dimethyl tin dineodecanoate, dioctyl dilauryl tin, and dibutyl butoxy chlorotin, as well as mixtures thereof. The glassy matrix can be formed by using a Sol-Gel process such as described in U.S. Pat. No. 6,313,193, the disclosure of which is incorporated herein by reference in its entirety. Other methods of forming the matrix will be within the skill of one in the art.

The thermal barrier composition may also optionally include fillers such as, without limitation, glass fibers, fumed silica, mica, kaolin, bentonite, talc, zinc oxides, iron oxides and pigments or other fillers, as will be readily apparent to those skilled in the art. The composition may also include hollow glass microspheres to provide additional heat resistance. Preferably, thin-walled glass microspheres are used. Typically the volume percent of glass microspheres is from about 30 percent to about 80 percent. If the higher amount is used, it is preferable to include milled glass fibers to improve durability. Anti-corrosion agents such as zinc phosphates and zinc salts can also be added.

In operation, the thermal barrier composition of the present invention can be applied to a substrate by roll-coating, brush, spray coating dipping and the like. It is preferred that the user mix the catalyst with the other components right before or substantially contemporaneously with application to form an interpenetrating polymer network of glass and silicone on the surface of the substrate. Inasmuch as crosslinking occurs via a moisture condensation reaction between ethoxy and hydroxyl groups, the condensation inherently present on the substrate and/or in the atmosphere can be used advantageously.

The following specific examples are provided to afford a better understanding of the present invention to those skilled in the art. It is to be understood that these examples are intended to be illustrative only and is not intended to limit the invention in any way.

EXAMPLES

Example 1

1. Formulation

| wt % | Component |
| --- | --- |
| 6.79 | Poly(methylsilsesquioxane) |
| 10.50 | Titanium isopropoxide |
| 4.19 | Polydiethoxysiloxane |
| 21.00 | Silanol-terminated polydimethylsiloxane (4200 g/mol) |
| 7.35 | Titanium diisopropoxide (Bis-2,4-pentanedionate) |
| 4.19 | Polydiethoxysiloxane |
| 31.49 | Mica 325 mesh |
| 13.48 | Heucophos ZPO (zinc organophosphate) Corrosion Protection |
| 1.50 | Heucorin RZ (zinc salt) Corrosion Protection |

2. Manufacturing Steps

The first step is to dissolve the polymethysilsesquioxane (POSS) into the titanium isopropoxide (TIPO). This is accomplished by mixing the POSS into the titanium isopropoxide and heating at 100° C. for 24 hours.

The second step is to mix the silanol terminated polydimethylsiloxane with the titanium diisopropoxide (bis-2,4-pentanedionate) and allowing the mixture to crosslink for 1 hour.

If this step is not performed, the silanol groups on the polymer will instantly react with the titanium isopropoxide and the system will gel in a matter of seconds.

The third step is to add the remaining components to the POSS/TIPO prepared in the first step (A component), keeping the titanium diisopropoxide (bis-2,4-pentanedionate)/polydimethylsiloxane mixture prepared in the second step out as the B component in an A/B system.

Example 2

Formulation

| wt % | Component |
|---|---|
| 24.07 | Polysilsesquioxane dissolved in titanium isopropoxide and 20% polydiethoxysiloxane |
| 5.42 | Epoxy-functionalized polydimethylsiloxane |
| 0.61 | Aminopropyltriethoxy silane |
| 16.05 | Milled glass fiber |
| 10.57 | Hollow glass microspheres |
| 1.20 | Dibutyl tin dilaurate |
| 40.12 | Isopropyl alcohol |
| 1.78 | Titanium dioxide |
| 0.18 | Carbon Black |

The formulation was manufactured using the same steps as Example 1 except that the POSS did not have to be pre-reacted with the TIPO. The formulation of Example 2 was used in various tests as described below and in Table 1.

Durability Testing

A series of durability tests were performed on the coating composition of Example 2. These tests were designed to simulate real-world events that will test the durability of the coating. The three specific tests performed on the coating composition of Example 2 included: two tool drop tests, a falling sand test, and a 200 lb, 90° pivot test.

The first tool drop test consisted of dropping a 106 gram wrench from a height of 48 inches onto a panel coated with the coating composition of Example 2. This test which was repeated multiple times resulted in a dent of about 5 mm×5 mm. The second tool drop test consisted of dropping a 783 gram hammer from the same 48 inch height. The tool drop resulted in a dent of about 15 mm×25 mm.

The indentions from the tool drop tests are consistent with the energy expected form objects of similar size and mass dropped form a height of 48 inches. No cracking or delamination occurred the coating and the divots can be easily repaired with the coating composition of Example 2.

The falling sand test consisted of dropping 1 gallon of sand from a height of 1.5 feet in a concentrated stream onto the surface of a steel panel coasted with the coating composition of Example 2 mounted 45° to the falling sand.

As a results of this test, the impact zone was abraded in a region about 10 mm×16 mm×0.5 mm. The coating composition of Example 2 demonstrated good abrasion resistance.

The third durability test consisted of a 200 lb person standing on a plate coated with the coating composition of Example 2 with all weight on one foot. Then the person pivoted 90°. No damage resulted to the coating composition of Example 2. The test demonstrates the coating composition of Example 2 can be walked on (e.g., a plane wing) with no damage.

TABLE 1

| Property | Approach | Test Method | Standard | Results |
|---|---|---|---|---|
| Flexure | Mechanically flex a coated titanium strip until the coating cracks or delaminates | Apply coating to 6-inch titanium strips. Bend strips over rods of increasing diameter until cracks appear. | ASTM-D6272 modified | 6 of 10 strips experienced cracking when bent over 1.50" rods. Only 4 of 10 strips experienced cracking when bent over 1.25" rods. Conclusion: excellent flexure for intended application |
| Lap Joint Adhesion | Test adhesion of coating to jet engine parts. | Apply coating to Ti strips (1" × 6" × ⅛"). Bond them. | ASTM D3164.03 | Coating became stronger after exposure to high temperature. Strong adhesion to Ti - no observable degradation from high temperature. All failures were cohesive. |
| 1. R-Value 2. Temperature difference = 200° F. | 1. Determine R-value from independent lab for 3 thicknesses (⅛-inch, ¼-inch, and ½-inch). Estimate temperature drop using AFRL models. 2. Demonstrate coating will create 200° F. temperature delta. | 1. Measure thermal conductivity at 700° F. of samples of varying thickness with independent lab. 2. One side of coating held at 1000° F. Temperature measured at TBC-Ti interface. | 1. ASTM E1530-99 2. Turkey Fryer Rig. | Thermal conductivity = 0.15 W/m * K) at 561° F. Temperature Delta across coating = 337° F. with 3.0 mm thick coating. |
| Durability | Perform in-house tests tailored to the operational environment during Phase I, to determine feasibility. | a. Simulate 200-lb person standing on a coasted plate and pivoting. b. Drop tool on coated plate form 4-feet. c. Perform simple abrasion resistance test using falling sand method. | ASTM D5420-98a ASTM D968-93 | High probability that coating will have sufficient durability. |
| Repairability | Intentionally damage coated Ti coupons (hammer, scrape). Repair the coupon and assess the quality of the repair by knife adhesion tests and visual inspection. | | None | Repair tests demonstrated that coating was restored to like-new condition. |
| Vibration | Use AFRL table vibration that will provide 160 dB noise and 900° F. Quartz lamp. | AFRL | AFRL | Results indicate high probability that coating will withstand vibration environment. |

Temperature Delta Data

A titanium plate with a 2.5 mm build of the coating composition of Example 2 was prepared. A 3 mm wide channel was cut into the coating from the center of the plate to the edge, and a thermocouple was positioned in the channel such that it would be in contact with the titanium plate. The coating composition of Example 2 was applied over the thermocouple to fill the channel and seal the thermocouple at the interface of the coating composition of Example 2 and the titanium plate, producing a sample with the thermocouple counted at the interface of the coating composition of Example 2 and the titanium. Total coating thickness was approximately 3.0 mm.

After the coating was cured, the plate was placed onto a steel block and was heated to a temperature of 1057° F. by a burner on the turkey fryer. The sample was placed with the coating composition of Example 2 directly in contact with the hot steel block, and allowed to equilibrate for 78 minutes to allow for steady state heat flow.

The temperature measurement at the coating composition of Example 2-titanium interface was found to be 720° F. with the hot steel measuring 1057° F.: a temperature delta of 337° F. across the coating composition of Example 2 for a coating that is 3.0 mm thick.

Measure Thermal Conductivity

Thermal conductivity was measured on a free standing coating composition of Example 2 film using the ASTM E1530 standard test method. Measurements were conducted at 105° F., 334° F., and 561° F. The results are listed in the Table 2.

TABLE 2

Thermal Conductivity Test (ASTM D1530)

| Measurement Temperature ° F. | Thermal Conductivity (W/(m * K)) |
|---|---|
| 105.4 | 0.11 |
| 334.2 | 0.12 |
| 560.8 | 0.15 |

In the specification and examples, there have been disclosed typical preferred embodiments of the invention and, although specific terms are employed, they are used in a generic and descriptive sense only and not for purposes of limitation of the scope of the invention set forth in the following claims.

That which is claimed is:

1. A thermal barrier coating composition comprising a glassy matrix comprising:
    (a) an alkoxy-functionalized siloxane or alkoxy-functionalized silane and a functionally-terminated silane or siloxane;
    (b) polymethylsilsesquioxane dissolved in a crosslinking agent;
    (c) a filler, and
    (d) hollow glass microspheres.

2. The thermal barrier coating composition according to claim 1, wherein the alkoxy-functionalized siloxane or alkoxy-functionalized silane is selected from the group consisting of polydiethoxysiloxane, polydimethoxysiloxane, tetramethoxysilane and tetraethoxysilane and the functionally-terminated silane or siloxane is an epoxy-functionalized polydiethoxysiloxane.

3. The thermal barrier coating composition according to claim 1, wherein the crosslinking agent is titanium isopropoxide.

4. The thermal barrier coating composition according to claim 1, wherein the filler is selected from the group consisting of fumed silica, mica, kaolin, bentonite, talc, zinc oxides, iron oxides and pigments.

5. The thermal barrier coating composition according to claim 1, wherein the glassy matrix is crosslinked using a titanium or tin catalyst.

6. The thermal barrier coating composition according to claim 5, wherein the titanium or tin catalyst is selected from the group consisting of titanium methoxide, titanium ethoxide, titanium isopropoxide, titanium propoxide, titanium butoxide, titanium diisopropoxide (bis 2,4-pentanedionate), titanium diisopropoxide bis(ethylacetoacetao) titanium ethylhexoxide, dibutyl tin diacetate, dibutyltin laurate, dimethyl tin dineodecanoate, dioctyl dilauryl tin, and dibutyl butoxy chlorotin, and mixtures thereof.

7. The thermal barrier coating composition according to claim 1, further comprising an anti-corrosion agent.

8. A substrate coated with a thermal barrier composition, wherein said thermal barrier composition comprises a glassy matrix comprising:
    (a) an alkoxy-functionalized siloxane and a functionally-terminated silane or siloxane;
    (b) polymethylsilsesquioxane dissolved in a crosslinking agent;
    (c) filler; and
    (d) hollow glass microspheres.

9. The substrate according to claim 8, wherein the substrate is selected from the group consisting of steel, stainless steel, titanium, aluminum, magnesium and zinc.

10. The substrate according to claim 8, wherein the alkoxy-functionalized siloxane or alkoxy-functionalized silane is selected from the group consisting of polydiethoxysiloxane, polydimethoxysiloxane, tetramethoxysilane and tetraethoxysilane and the functionally-terminated silane or siloxane is an epoxy-functionalized polydiethoxysiloxane.

11. The substrate according to claim 8, wherein the crosslinking agent is titanium isopropoxide.

12. The substrate according to claim 8, wherein the filler is selected from the group consisting of fumed silica, mica, kaolin, bentonite, talc, zinc oxides, iron oxides, and pigments.

13. The substrate according to claim 8, wherein the glassy matrix is crosslinked using a titanium or tin catalyst.

14. The substrate according to claim 13, wherein the titanium or tin catalyst is selected from the group consisting of titanium methoxide, titanium ethoxide, titanium isopropoxide, titanium propoxide, titanium butoxide, titanium diisopropoxide (bis 2,4-pentanedionate), titanium diisopropoxide bis(ethylacetoacetao) titanium ethylhexoxide, dibutyl tin diacetate, dibutyltin laurate, dimethyl tin dineodecanoate, dioctyl dilauryl tin, and dibutyl butoxy chlorotin, and mixtures thereof.

15. The substrate according to claim 8, further comprising an anti-corrosion agent.

16. A substrate coated with a thermal barrier composition, wherein said thermal barrier composition comprises a glassy matrix comprising:
    (a) an alkoxy-functionalized siloxane and a functionally-terminated silane or siloxane;
    (b) polymethylsilsesquioxane dissolved in a crosslinking agent;
    (c) optionally, a filler; and
    (d) optionally hollow glass microspheres, wherein the crosslinking agent is titanium isopropoxide.

17. The substrate according to claim 16, wherein the substrate is selected from the group consisting of steel, stainless steel, titanium, aluminum, magnesium and zinc.

18. The substrate according to claim 16, wherein the alkoxy-functionalized siloxane is selected from the group consisting of polydiethoxysiloxane, polydimethoxysiloxane, tetramethoxysilane and tetraethoxysilane and the functionally-terminated silane or siloxane is an epoxy-functionalized polydiethoxysiloxane.

19. The substrate according to claim 16, wherein the filler is selected from the group consisting of fumed silica, mica, kaolin, bentonite, talc, zinc oxides, iron oxides, and pigments.

20. The substrate according to claim 16, wherein the glassy matrix is crosslinked using a titanium or tin catalyst.

21. The substrate according to claim 20, wherein the titanium or tin catalyst is selected from the group consisting of titanium methoxide, titanium ethoxide, titanium isopropoxide, titanium propoxide, titanium butoxide, titanium diisopropoxide (bis 2,4-pentanedionate), titanium diisopropoxide bis(ethylacetoacetao) titanium ethylhexoxide, dibutyl tin diacetate, dibutyltin laurate, dimethyl tin dineodecanoate, dioctyl dilauryl tin, and dibutyl butoxy chlorotin, and mixtures thereof.

22. The substrate according to claim 16, further comprising an anti-corrosion agent.

* * * * *

UNITED STATES PATENT AND TRADEMARK OFFICE
CERTIFICATE OF CORRECTION

| | |
|---|---|
| PATENT NO. | : 7,687,150 B2 |
| APPLICATION NO. | : 11/324687 |
| DATED | : March 30, 2010 |
| INVENTOR(S) | : Simendinger, III et al. |

It is certified that error appears in the above-identified patent and that said Letters Patent is hereby corrected as shown below:

Column 1, Line 48:   Please correct "comprising: an" to read -- comprising: (a) an --

Signed and Sealed this

Thirty-first Day of August, 2010

David J. Kappos
*Director of the United States Patent and Trademark Office*